Jan. 12, 1937.  C. E. COOPER ET AL  2,067,753

FRUIT BASKET AND LINER THEREFOR

Filed Feb. 27, 1936   2 Sheets-Sheet 1

INVENTOR.
Charles E. Cooper
Joseph L. Willmeng
BY
ATTORNEYS

Jan. 12, 1937.    C. E. COOPER ET AL    2,067,753
FRUIT BASKET AND LINER THEREFOR
Filed Feb. 27, 1936    2 Sheets-Sheet 2
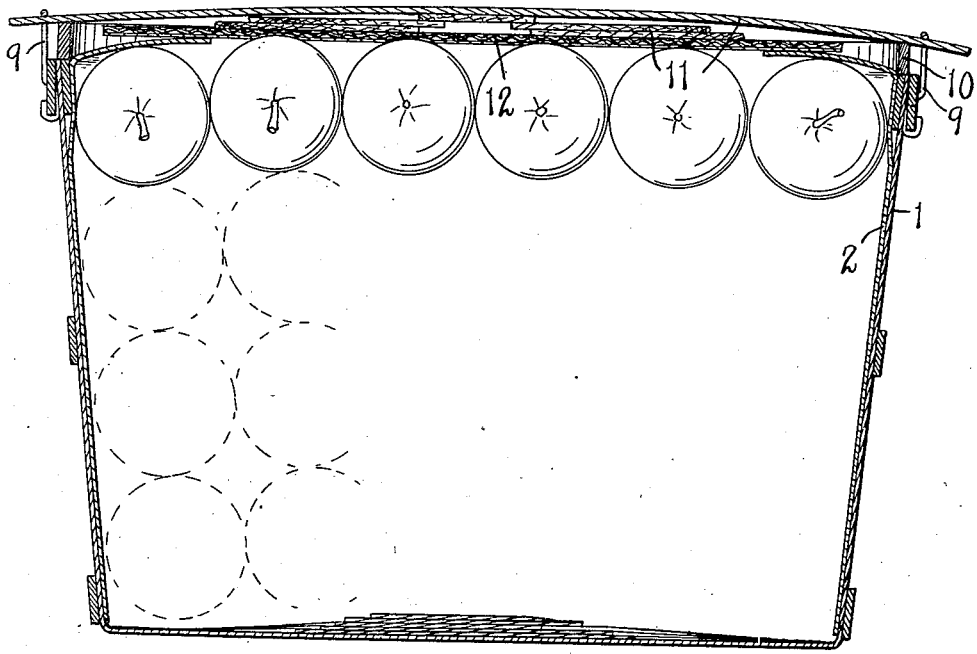
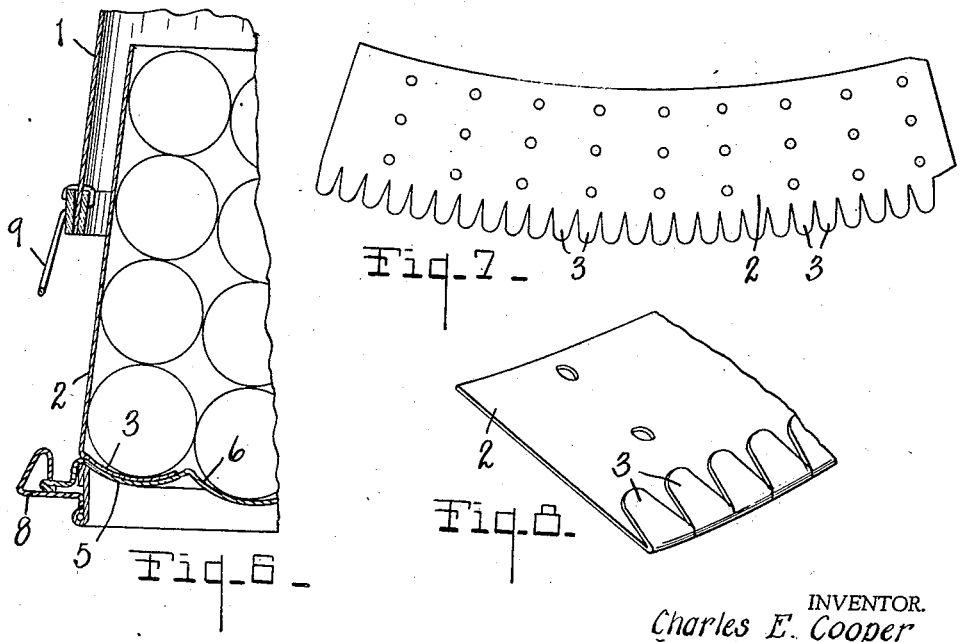
INVENTOR.
Charles E. Cooper
Joseph L. Willmeng
BY
ATTORNEYS Patented Jan. 12, 1937

2,067,753

UNITED STATES PATENT OFFICE 2,067,753

FRUIT BASKET AND LINER THEREFOR

Charles E. Cooper, Benton Harbor, and Joseph L. Willmeng, Watervliet, Mich.

Application February 27, 1936, Serial No. 66,086

2 Claims. (Cl. 217—3)

The objects of the invention are:

First, to provide an improved basket fruit package and liner with integral protective and decorative flaps or tabs.

Second, to provide an improved construction of protective and decorative liner for such purpose.

Third, to provide an improved structure which lends itself to a method of packing whereby the decorative liner will be effectively disposed by the process of packing the fruit therein and retained, and the packed fruit will be retained in place and protected from injury.

In the packaging of fruit by the latest improved method, when straight side bushel baskets are used, a liner is provided inside to keep the fruit from contacting with the side wall of the basket and also for the purpose of permitting the arrangement of the fruit inside the liner and thus avoiding the necessity of providing a basket with a removable bottom. There has heretofore been inserted in such baskets a decorative strip with tabs that were designed to project radially in over the top of the fruit when the basket is opened. Because these liners have been made for decoration only in separate parts, the fruit is not effectively retained by the liner and separate decorative strips and often gets out of control to such an extent that considerable loss of fruit is due to the rim-cutting of the fruit by the rim of the basket cover. Further, by this method it has been possible only with considerable difficulty and skill to so arrange the fruit in the package that it would retain its position when the body of the basket is put over it. We have thus stated, the practice, so that the objects of our invention will be the more readily understood. We effectively retain the fruit in proper position for the package and also protect the same and exhibit it in the best possible form.

The invention and means for carrying out our invention are illustrated in the accompanying drawings, in which:

Fig. 3 is an enlarged detail vertical sectional view through such a basket, showing the position and relation of the liner, how the tabs project over the peripheral ring row of fruit and are overlapped by the corrugated cap paper cover disk liner inside the basket cover.

Fig. 6 is a detail sectional view showing how the liner is maintained by the packed fruit when the packing form is lifted off preparatory to dropping the inverted basket in place.

Fig. 7 is a reduced view of the blank of the liner with the tabs shown thereon as the blank is punched from the paper stock.

Fig. 8 is a view of the blank of Fig. 7 with the tabs folded up into the plane of the body of the blank as the liners are shipped ready for use.

The parts will be identified by their numerals of reference which are the same in all the views.

1 is the usual construction of straight side bushel basket for packing fruit, such as apples, peaches or similar fruit, which it is desired to protect and display. Within the basket is the conical liner 2, preferably made from a paper blank as illustrated in Fig. 7, the ends of which are joined by adhesive, riveting, or other means well known to the art. The liner 2 is provided with inwardly-projecting protective and decorative flaps or tabs 3 which are creased or folded and project laterally and radially over the fruit within the basket. These tabs or flaps are preferably in length equal to the diameter of the fruit, such as apples, being packed. They are folded tightly up against the liner, as illustrated in Fig. 8. When placed on the packing plate these tabs are deflected out to receive the outer ring or peripheral row of fruit at the top of the basket. The liner is preferably perforated as seen in Fig. 7, depending more or less on the character of the fruit within the basket.

5 is the packing base of usual construction with concentric recesses or corrugations 6 in which the fruit is arranged in circular tiers. On this base is placed the liner 2, with the flaps or tabs 3 folded tightly against the same. The tabs 3 are then deflected down and pointed radially inwardly and as the fruit is packed within the concentric recesses 6, the tabs 3 are forced down and are held between the fruit and the packing base. Because the tabs 3 are continuous or integral with the liner, they serve to retain the liner securely in position and protect the fruit from rim cut by the cover or top rim or hoop of the basket.

Figure 1:
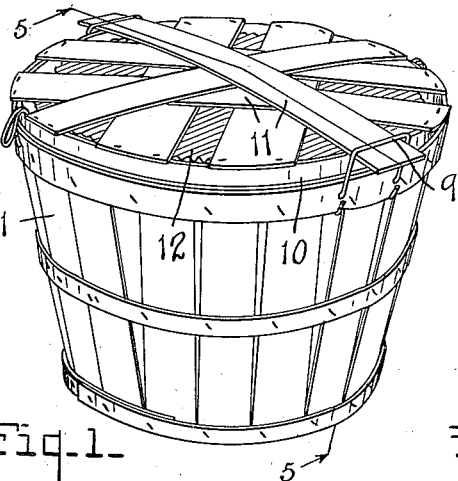
Fig. 1 is a perspective view of a straight side bushel basket closed, concealing the improved lining and packaging means inside, the cap cover disk appearing between the slats of the basket cover.
Figure 2:
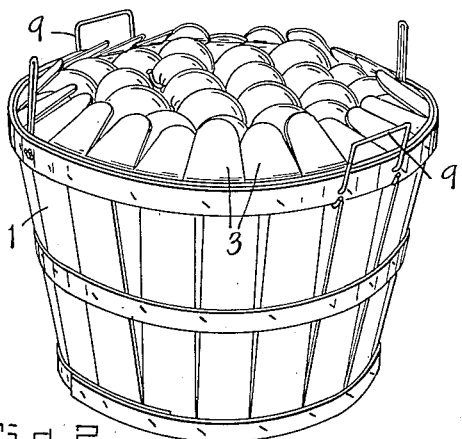
Fig. 2 is a similar perspective view with the basket cover and protective cap corrugated disk cover lining removed, showing how the tabs of the liner project over and engage and protect the outer ring of fruit.
Figure 4:
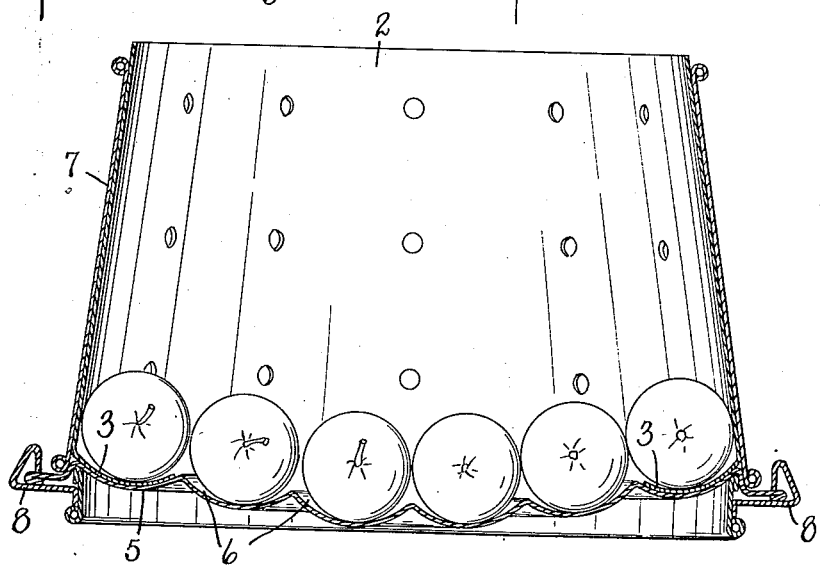
Fig. 4 is a detail vertical sectional view through the liner and packing form and base, showing how the fruit, particularly the peripheral row or ring of the top layer, is overlapped onto the decorative tabs and that the consequent weight of the fruit anchors the liner in position and helps maintain the packed fruit in position to properly receive the inverted basket when placed over the same.
Figure 5:
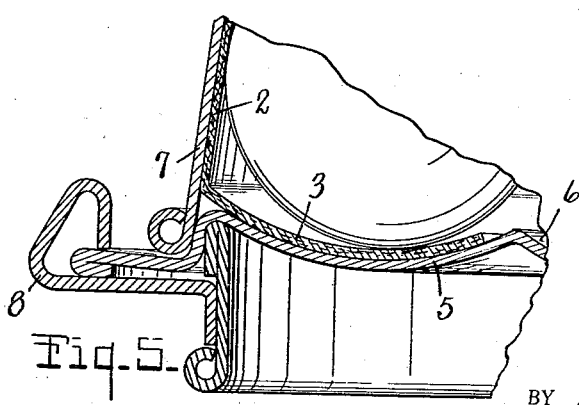
Fig. 5 is an enlarged sectional detail view showing how one of the apples of the peripheral row engages both the tab and the wall of the liner to retain and locate the liner in position.

The liner is arranged within a form 7 upon the base 5 which embraces the liner, as illustrated in Fig. 4. After the liner is thus placed and the fruit effectively arranged, the form 7 is removed and the basket 1 is placed in position about the liner, as seen in Fig. 3, the step of removing the form being shown in Fig. 6. The base is provided with projections 8 and the bushel basket is provided with pivoted wire handles 9 which loop over the projections 9 and clamp and retain the basket in position about the liner and until the basket can be swung to the upright position after the fruit has been put in place. After the basket is put in place the whole structure is inverted so that the basket is right side up and a circular liner disk or cap of corrugated paper board 12 is put in place which overlaps the tabs 3 and serves to retain the fruit within the top of the basket and prevents the fruit from being cut by the cover rim. The cover is made up of the usual rim or hoop 10 and cross slats 11. The tabs and the corrugated cap paper cover disk protect the fruit from contact with and damage by the cover rim, and the liner being effectively supported protects the fruit from damage by the basket also.

We desire to claim the package with the liner and the liner, specifically and broadly as pointed out in the appended claims.

Having thus described our invention, what we claim as new and desire to secure by Letters Patent is:

1. A fruit package comprising a straight side bushel basket, a conical flexible paper liner for the walls of said basket with radially inwardly-projecting protective and decorative tabs integral therewith and creased and folded at their bases extending externally over the outer ring of fruit and adapted to be engaged thereby, a corrugated protective cover cap disk adapted to engage the said tab extensions at the periphery and retain them against the fruit to protect the same, and a basket cover comprising a rim and cross slats embracing the said disk and tabs.

2. A fruit package comprising a straight side bushel basket, a conical flexible paper liner for the walls of said basket with radially inwardly-projecting protective and decorative tabs integral therewith and creased and folded at their bases extending externally over the outer ring of fruit and adapted to be engaged thereby, and a basket cover embracing the same.

CHARLES E. COOPER.
JOSEPH L. WILLMENG.